(12) United States Patent
Lilligreen et al.

(10) Patent No.: US 11,761,510 B2
(45) Date of Patent: Sep. 19, 2023

(54) HYDRAULIC MOUNT (71) Applicant: VIBRACOUSTIC GMBH, Darmstadt (DE)

(72) Inventors: Michael Lilligreen, Worms (DE); Jan Philipp, Einhausen (DE); Thomas Schemer, Weinheim (DE); Timo Stöcker, Hemsbach (DE)

(73) Assignee: Vibracoustic SE, Darmstadt (DE)

( * ) Notice: Subject to any disclaimer, the term of this patent is extended or adjusted under 35 U.S.C. 154(b) by 1033 days.

(21) Appl. No.: 16/336,610

(22) PCT Filed: Sep. 27, 2017

(86) PCT No.: PCT/EP2017/074526
§ 371 (c)(1),
(2) Date: Mar. 26, 2019

(87) PCT Pub. No.: WO2018/060268
PCT Pub. Date: Apr. 5, 2018

(65) Prior Publication Data
US 2019/0234481 A1 Aug. 1, 2019

(30) Foreign Application Priority Data

Sep. 29, 2016 (DE) ..................... 10 2016 118 563.9

(51) Int. Cl.
*F16F 13/26* (2006.01)
*F16F 13/10* (2006.01)

(52) U.S. Cl.
CPC .......... *F16F 13/266* (2013.01); *F16F 13/107* (2013.01); *F16F 13/264* (2013.01); *F16F 13/268* (2013.01)

(58) Field of Classification Search
CPC ...... F16F 13/264; F16F 13/266; F16F 13/268; F16F 13/107

(Continued)

(56) References Cited

U.S. PATENT DOCUMENTS 5,386,977 A  2/1995  Quast
6,206,351 B1  3/2001  Hamada et al.
(Continued)

FOREIGN PATENT DOCUMENTS

CN  1626845 A  6/2005
CN  103867853 A  6/2014
(Continued)

OTHER PUBLICATIONS

International Search Report PCT/EP2017/074526, dated Jan. 4, 2018.

(Continued)

*Primary Examiner* — Thomas J Williams
(74) *Attorney, Agent, or Firm* — Fishman Stewart PLLC (57) ABSTRACT

A hydromount for mounting a motor vehicle unit is disclosed. The hydromount includes a supporting spring supporting a mount core and surrounding a working chamber, and a compensation chamber separated from the working chamber by a dividing wall and delimited by a compensation diaphragm. In embodiments, the compensation chamber and the working chamber are filled with a liquid and are connected by a damping duct incorporated into the dividing wall. In an embodiment, the dividing wall has two dividing plates between which a diaphragm is accommodated in a manner capable of oscillating. In an embodiment, the diaphragm and the dividing wall delimit an air chamber connected to the environment via an opening in the dividing wall, and the opening can be unblocked and closed by a switchable non-return device having a pressure-actuatable non-return valve with an opening pressure set to or having an oscillation amplitude of the diaphragm.

20 Claims, 4 Drawing Sheets (58) Field of Classification Search
USPC ........................................ 267/140.14, 140.15
See application file for complete search history.

(56) References Cited

U.S. PATENT DOCUMENTS

| | | |
|---|---|---|
| 7,210,674 B2 | 5/2007 | Maeno et al. |
| 9,416,843 B2 | 8/2016 | Lemaire et al. |
| 10,753,422 B2 * | 8/2020 | Raida ...................... F16F 13/10 |
| 2004/0150145 A1 * | 8/2004 | Tewani ................. F16F 13/264 |
| | | 267/140.14 |
| 2008/0174058 A1 * | 7/2008 | Saiki ..................... F16F 13/266 |
| | | 267/140.14 |
| 2019/0234481 A1 * | 8/2019 | Lilligreen ............. F16F 13/107 |

FOREIGN PATENT DOCUMENTS

| | | | | |
|---|---|---|---|---|
| DE | 4238752 C1 | 5/1994 | | |
| DE | 102014118502 A1 | 6/2016 | | |
| DE | 102016101829 A1 * | 8/2017 | ............ | F16F 13/107 |
| EP | 2103837 A1 | 9/2009 | | |
| EP | 2908023 A1 | 8/2015 | | |
| FR | 2795148 A1 | 12/2000 | | |
| JP | S60157540 A | 8/1985 | | |

OTHER PUBLICATIONS

CN Search Report, 2017800328713, dated Jul. 19, 2020.
CN Office Action, 201780032871.3, dated Jul. 23, 2020.

* cited by examiner

HYDRAULIC MOUNT

CROSS-REFERENCE TO RELATED APPLICATIONS

This application is a National Stage Patent Application of International Patent Application No. PCT/EP2017/074526, filed Sep. 27, 2017, which claims the benefit of German Application Serial No. 10 2016 118 563.9, filed Sep. 29, 2016, the contents of each are incorporated by reference in their entireties.

TECHNICAL FIELD

The invention relates to a hydromount for mounting a motor vehicle unit, in particular for mounting a motor vehicle engine on a motor vehicle body, comprising a supporting spring supporting a mount core and surrounding a working chamber, and a compensation chamber separated from the working chamber by a dividing wall and delimited by a compensation diaphragm, wherein the compensation chamber and the working chamber are filled with a liquid and are connected to each other by a damping duct incorporated into the dividing wall, and wherein the dividing wall has two dividing plates between which a diaphragm is accommodated in a manner capable of oscillating.

BACKGROUND

Such hydromounts are also referred to as hydraulically damping mounts and serve, in particular, for supporting a motor vehicle engine on a motor vehicle body in order to, on the one hand, dampen the vibrations caused by road bumps and, on the other hand, to provide insulation against acoustic vibrations. For example, the supporting spring consisting of an elastomeric material effects an acoustic insulation. The vibrations caused by road bumps are dampened by a hydraulic system, with the hydraulic system being formed by the liquid-dampened working chamber, the compensation chamber, and the damping duct connecting the two chambers with each other.

The working chamber is made larger or smaller by a movement of the supporting spring, whereby a hydraulic pressure is built up in the working chamber. Due to the pressure, the liquid located in the working chamber is pressed via the damping duct into the compensation chamber. Due to the small diameter of the damping duct and the high mechanical transmission associated therewith, which results from the equivalent displacing cross-section of the supporting spring in relation to the damping duct cross-section, the introduced vibrations are absorbed or damped.

In order to decouple high-frequency, low-amplitude vibrations, i.e. in the acoustically relevant range, the incorporation of an elastic membrane with or without play within the dividing wall is known. In this case, the membrane oscillates with high-frequency, low-amplitude oscillations, so that a damping action is decoupled via the damping channel.

In idle operation of the engine, a dynamic reduction smaller than the static stiffness of the mount is desirable. In contrast, a high level of stiffness of the mount is demanded in the driving operation in order to obtain the required damping properties. In this regard, it is known to provide the hydromount with a switching device with which the mount can be adapted to a driving operation or an idle operation of the engine.

DE 10 2014 118 502 A1 discloses a hydromount with a switchable decoupling diaphragm. The decoupling diaphragm can be switched by means of a switching magnet. Thus, the decoupling diaphragm can be switched from a state of low stiffness into a state of high stiffness and back.

A switchable elastic unit mount for a motor vehicle is known from EP 2 103 837 A1, in which a working compartment filled with hydraulic liquid is separated from an air compartment by a decoupling diaphragm. The air compartment is connected to the environment by means of a venting channel, wherein the venting channel is switchable.

SUMMARY

The invention is based on the object of providing a mount that has an improved stiffness.

A hydromount with the features of claim 1 is proposed in order to achieve this object.

Advantageous embodiments of the hydromount are the subject matter of the depend-ent claims.

The hydromount according to the invention serves for mounting a motor vehicle unit, in particular for mounting a motor vehicle engine on a motor vehicle body, and comprises a supporting spring supporting a mount core and surrounding a working chamber, and a compensation chamber separated from the working chamber by a dividing wall and delimited by a compensation diaphragm, wherein the compensation chamber and the working chamber are filled with a liquid and are connected to each other by a damping duct incorporated into the dividing wall, and wherein the dividing wall has two dividing plates between which a diaphragm is accommodated in an manner capable of oscillating, and wherein the diaphragm and the dividing wall delimit an air chamber that can be connected to the environment via an opening in the dividing wall. The opening can be unblocked and closed by means of a switchable non-return device. The non-return device has a pressure-actuatable non-return valve whose opening pressure can be set to an oscillation amplitude of the diaphragm, particularly to a predetermined and specifically settable oscillation amplitude.

In idle operation of the engine, it is desirable that the air chamber be filled with air. In this case, the diaphragm oscillates together with the air volume in the working chamber, which is in direct communication with the environment. In this state, the hydromount has a low stiffness, and dynamic stiffnesses below the static stiffness of the supporting spring can thus be achieved. Thus, the diaphragm oscillates with oscillations having a low amplitude at a high frequency, like they are introduced into the mount in idle operation of the engine, and thus causes decoupling. A damping action is prevented by the decoupling of the oscillations.

In driving operation, however, oscillations having a high amplitude at a low frequency act on the mount. In this case, a high stiffness of the diaphragm is desirable in order to dampen the oscillations. In order to increase the stiffness of the diaphragm, it is advantageous during the driving operation that the air chamber is evacuated as far as possible. The stiffness of the diaphragm can be influenced by venting and aerating the air chamber, so that the mount behavior can be adapted to the respective driving operation. A particularly large spreading of the stiffness can be achieved with the hydromount.

The non-return valve makes it possible that the air can escape into the environment from the air chamber only because the energy introduced into the mount due to an excitation by the unit can be used to achieve the two switching states of the mount, particularly the state in which the air chamber is partially or completely evacuated. In addition, switching capability enables the air chamber to be aerated forcibly, so that air may flow into the air chamber from the environment as needed. Thus, the mount behavior desired for the respective driving state can be directly influenced. In particular, a configuration that is advantageous for idle operation can be established in which the air chamber is in communication with the environment and is thus always filled with air.

Advantageously, the diaphragm generates a pressing force required for opening the non-return valve upon reaching the oscillation amplitude, in particular the predetermined and specifically settable oscillation amplitude. This pressing force corresponds to the opening pressure of the non-return valve.

Advantageously, the oscillation amplitude is produced because of a pressure acting in the working chamber, which can be created by exciting the hydromount with a predetermined excitation amplitude via the motor vehicle unit. Impacts from outside which are absorbed via the mount core cause a deformation of the supporting spring, and thus a compression of the working chamber. The liquid located in the working chamber is compressed, so that a hydraulic pressure is produced in the working chamber. This pressure acts on the diaphragm. Excited by the oscillating liquid, the diaphragm passes over into an oscillating motion and transmits the latter into the air chamber. When the oscillation in the air chamber exceeds a certain amplitude, this increases the pressure acting on the non-return valve, so that the non-return valve opens automatically. In this manner, the energy acting in the mount due to impacts introduced from outside can be used for unblocking the opening.

By repeating this process, the air chamber is successively evacuated until there is no air left in the air chamber. The impacts introduced into the mount from outside thus cause an effect of the air chamber being "pumped empty", whereby the stiffness of the diaphragm is increased and the hydromount achieves very high damping values.

Advantageously, the non-return device has a spring member and a closure device for closing the opening, wherein the spring member exerts a shutting force on the closure device, wherein the spring member is dimensioned in such a way that the closure device unblocks the opening when the oscillation amplitude, in particular the predetermined and specifically settable oscillation amplitude, is reached. Accordingly, the spring member causes the shutting force generated by the spring member to close the opening by means of the closure device. Once the oscillation amplitude acting on the non-return device exceeds a predetermined value, the closure device opens. Once the oscillation amplitude drops below the predetermined value, the shutting force exceeds the pressing force that acts on the non-return device as a consequence of the oscillation amplitude, and the non-return device closes automatically. Accordingly, the oscillation amplitude and the resulting pressing force, at which the closure device unblocks the opening, can be set by means of a corresponding dimensioning of the spring member.

Advantageously, the non-return device further has a stop member for limiting a movement of the closure device and a closure member connected to the closure device. When the pressing force acting on the non-return device exceeds the predetermined value and opens the non-return device, the closure device moves and opens the opening. The movement of the closure device is limited by means of the stop member. The closure member is configured in such a way that it is capable of sealing the opening tightly.

Advantageously, the air chamber is connected with the environment in a first switching state, and the air chamber is shut off from the environment in a second switching state. The switching capability makes it possible for air to flow into the air chamber from the environment as needed. Thus, the mount behavior desired for the respective driving state can be directly influenced. In particular, a configuration that is advantageous for idle operation can be established in which the air chamber is in communication with the environment and is thus always filled with air.

Advantageously, the non-return valve is active in the second switching state. This means that the non-return device is not switched in the second switching state. Accordingly, the non-return valve unblocks the opening in the second switching state if the predetermined and specifically settable oscillation amplitude and the resulting pressing force are reached, and closes it if the oscillation acting on the non-return valve has an amplitude that is smaller than the predetermined and specifically settable oscillation amplitude.

It is advantageous if the non-return device can be switched by means of an electromagnet. Due to switching capability, the non-return device is capable of unblocking the opening even when the pressing force acting on the closure device does not exceed the predetermined value, because the required force can be generated by the electromagnet. The electric terminals required for this switching capability are usually available in current motor vehicle models. Furthermore, a switching capability by means of an electromagnet can be realized inexpensively and in a compact manner. Additionally, the non-return device may also be switched by means of negative pressure.

The electromagnet may have a coil and a core. The core is disposed within the coil. A magnetic field, which sets the core in motion, is generated by applying a voltage to the coil. The core moves the closure device. In particular, the closure device may simultaneously constitute the core. Due to the movement of the closure device, the opening is unblocked by the non-return device.

Advantageously, the non-return device is accommodated in a cup member connected to the support mount. Such a configuration permits a compact design, which is advantageous particularly in automobile construction, due to the narrow construction spaces. Advantageously, the cup member is fixed by the support mount by bending the latter. This constitutes a particularly cost-effective fixing of the cup member on the support mount.

Advantageously, the dividing plate facing towards the working chamber is configured as a nozzle plate. Thus, oscillations of the liquid, which are introduced into the working chamber by an impact on the mount core and the compression of the working chamber caused thereby, can be transmitted onto the diaphragm, so that the latter begins an oscillating movement, whereby the oscillation is further transmitted onto the non-return device.

Advantageously, the opening is incorporated into the dividing plate facing away from the working chamber. Thus, the air chamber is delimited by the diaphragm and the dividing plate facing away from the working chamber. Thus, the dividing plate is able to fulfil a dual function. Advantageously, the dividing plate has an approximately bell-shaped contour in the area of the air chamber, so that the diaphragm has as large a deformation as possible in the evacuated state of the air chamber.

BRIEF DESCRIPTION OF THE DRAWINGS

The invention is schematically explained below with reference to drawings by means of exemplary embodiments. In the drawings.

DETAILED DESCRIPTION

Figure 1:
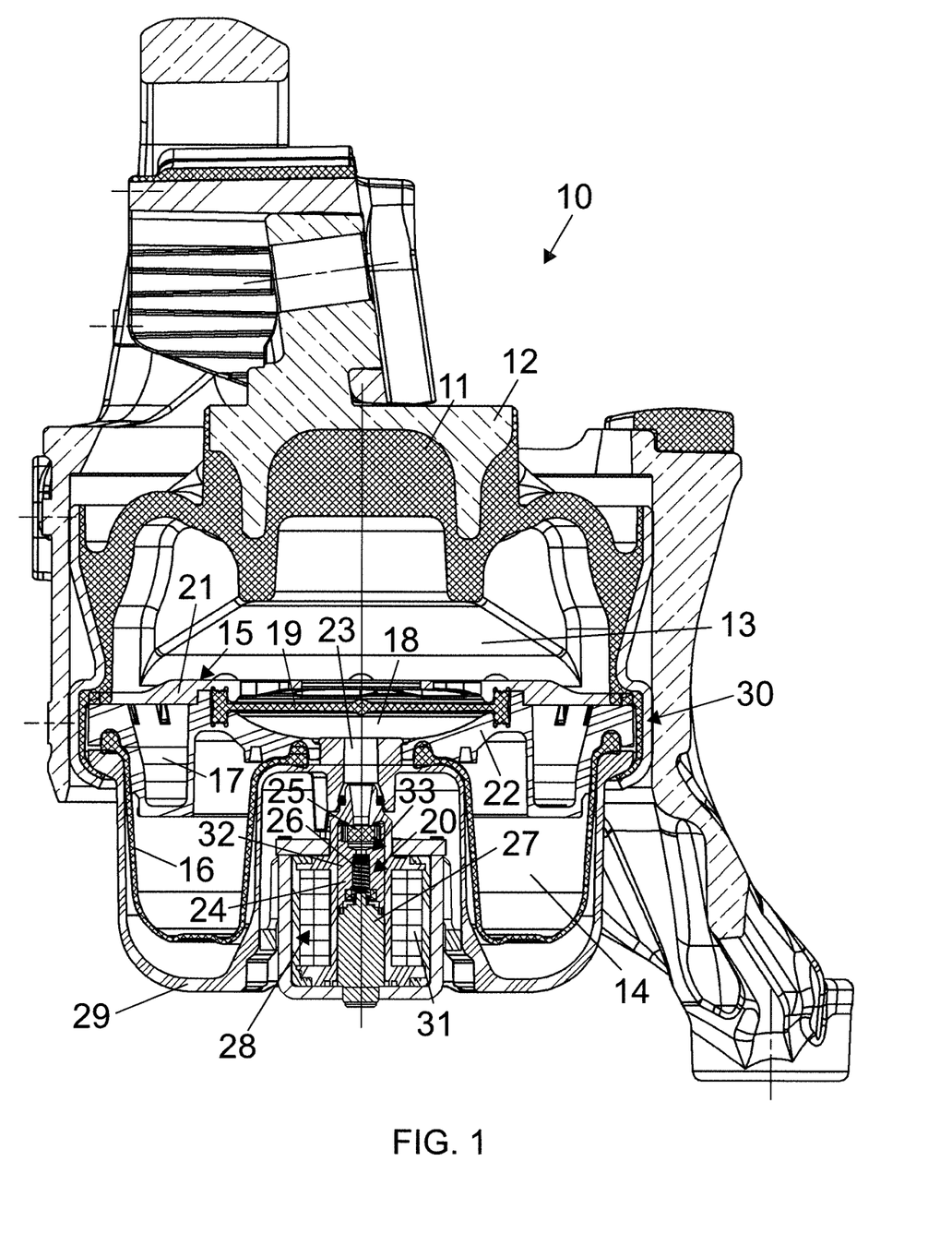
FIG. 1 shows a cross-sectional view of an exemplary embodiment of a hydromount in which the air chamber is filled completely.

FIG. 1 shows a hydromount 10 for supporting a motor vehicle unit that is not shown, in particular for supporting a motor vehicle engine on a motor vehicle body that is not shown. The hydromount 10 has a supporting spring 11 consisting of an elastomeric material for supporting a mount core 12 incorporated by vulcanization. The motor engine (not shown) is attached to the mount core 12.

The supporting spring 11 delimits a working chamber 13, which is separated from a compensation chamber 14 by means of a dividing wall 15. The compensation chamber 14 is delimited by a compensation diaphragm 16, which is also referred to as a roller bellows. The chambers 13 and 14 are filled with a hydraulic liquid and connected to each other in a liquid-conducting manner via a damping duct 17 disposed in the dividing wall 15.

The dividing wall 15 has dividing plates 21, 22. The dividing plates 21, 22 may be made from plastic. A diaphragm 19 is positively accommodated between the dividing plates 21, 22. The dividing plate 21 facing towards the working chamber 13 is configured as a nozzle plate.

The diaphragm 19 and the dividing plate 22 facing away from the working chamber 13 delimit an air chamber 18. The air chamber 18 can be connected to the environment via an opening 23. In the present case, the opening 23 is incorporated into the dividing plate 22 facing away from the working chamber 13.

The opening 23 can be unblocked and closed by means of a switchable non-return device 20, which has a pressure-actuatable non-return valve 33 with a spring member 26 and a closure device 24 for closing the opening 23. Furthermore, the non-return device 20 has a stop member 27 for limiting a movement of the closure device 24 and a closure member 25 connected to the closure device 24. The non-return device 20 is accommodated in a cup member 29 connected to the support mount 30. A projection 34 of the cup member 29 reaches into the opening 23.

The air chamber 18 is connected with the environment in a first switching state, and the air chamber 18 is shut off from the environment in a second switching state. The non-return valve 33 is active in the second switching state. This means that the non-return device 20 is not switched in the second switching state. Accordingly, the non-return valve 33 unblocks the opening 23 in the second switching state if a predetermined and specifically settable oscillation amplitude and the resulting pressing force, which corresponds to an opening pressure, are reached, and closes it if the pressing force acting on the non-return valve 33 is smaller than the shutting force of the spring member 26.

Figure 4:
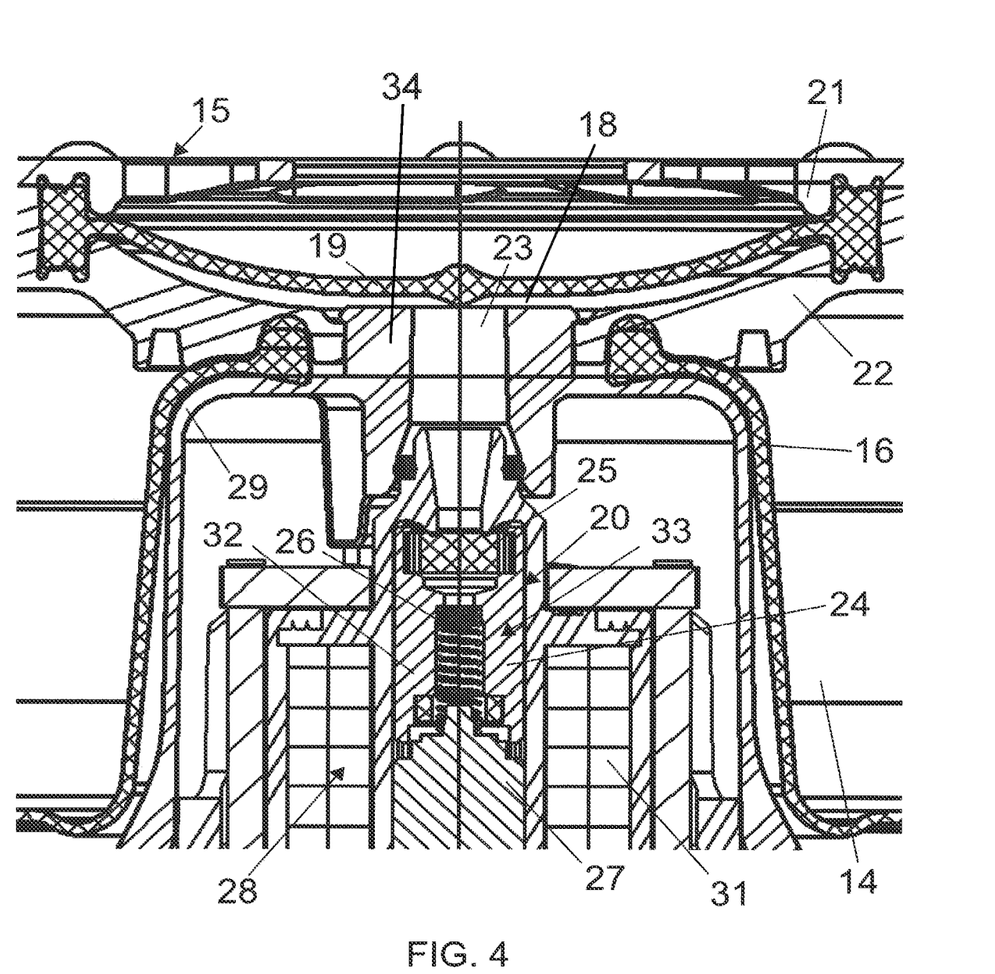
FIG. 4 shows an enlarged view of the air chamber, the diaphragm, the non-return device and the electromagnet.

In the present example, the non-return device 20 has an electromagnet 28 by means of which the non-return device 20 can be switched. As is apparent from FIG. 4, the electromagnet 28 has a coil 31 and a core 32. The core 32 is disposed within the coil 31. A magnetic field, which sets the core 32 in motion, is generated by applying a voltage to the coil 31. In the present case, the closure device 24 simultaneously constitutes the core 32. Due to the movement of the closure device 24, the opening 23 is unblocked by the non-return device 20.

If an oscillation is introduced into the mount 10 from the outside via the mount core 12, it causes the mount core 12 and the supporting spring 11 to move towards the working chamber 13. The volume of the working chamber 13 is thus made smaller, the hydraulic liquid located therein is compressed, and an oscillation of the hydraulic liquid is produced in the working chamber 13 due to the pressure acting therein. On the one hand, the hydraulic liquid oscillates through the damping duct 17 of the dividing wall 15 into the compensation chamber 14 and thus causes damping. On the other hand, the hydraulic liquid oscillates through the dividing plate 21 configured as a nozzle plate against the diaphragm 19. This excites and oscillation of the diaphragm 19 so that the latter starts oscillating against the air located in the air chamber 18. Thus, the diaphragm 19 causes a pressing force on the non-return device 20, in particular on the closure member 25, via the air oscillating in the air chamber 18. When the oscillation amplitude exceeds a predetermined and specifically settable value, the pressing force becomes so large that the closure member 25 and the closure device 24 are moved in such a way, against the shutting force caused by the spring member 26, that the opening 23 is unblocked. The predetermined and specifically settable oscillation amplitude and the predetermined pressing force resulting therefrom, which are required for the opening 23 to be unblocked by the non-return device 20, can thus be set by means of a suitable dimensioning of the spring member 26.

Due to the overpressure that is present in the air chamber 18 at that point in time, the air escapes from the air chamber 18 through the opening 23 and the non-return device 20. The air pressure in the air chamber 18 is thus reduced until the pressing force acting on the closure member 25 again drops below that of the spring force 26. Because of the shutting force caused by the spring member 26, the non-return device 20 is closed in this case, and the escape of the air from the air chamber 18 is thus prevented.

Figure 2:
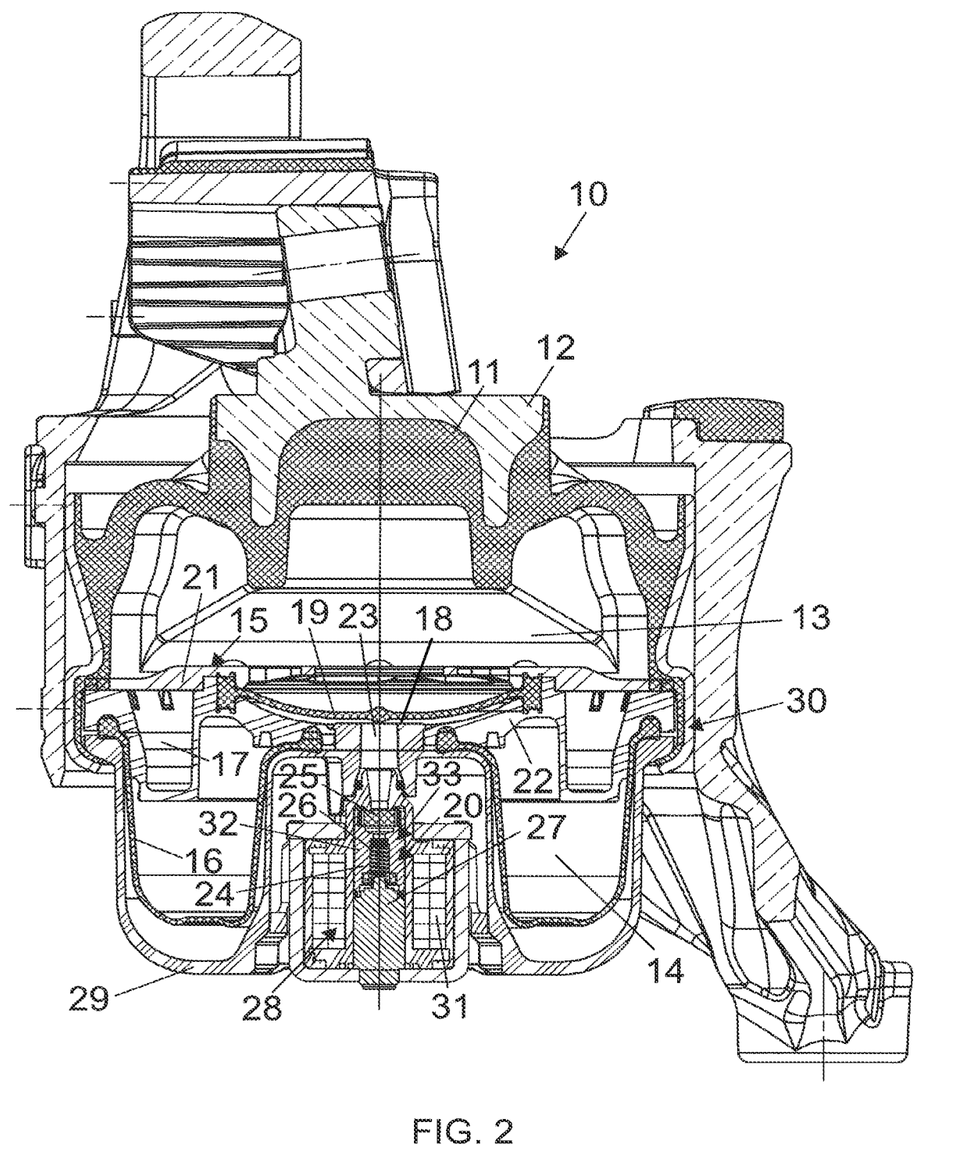
FIG. 2 shows a cross-sectional view of the hydromount from FIG. 1, in which the air chamber is partially evacuated.
Figure 3:
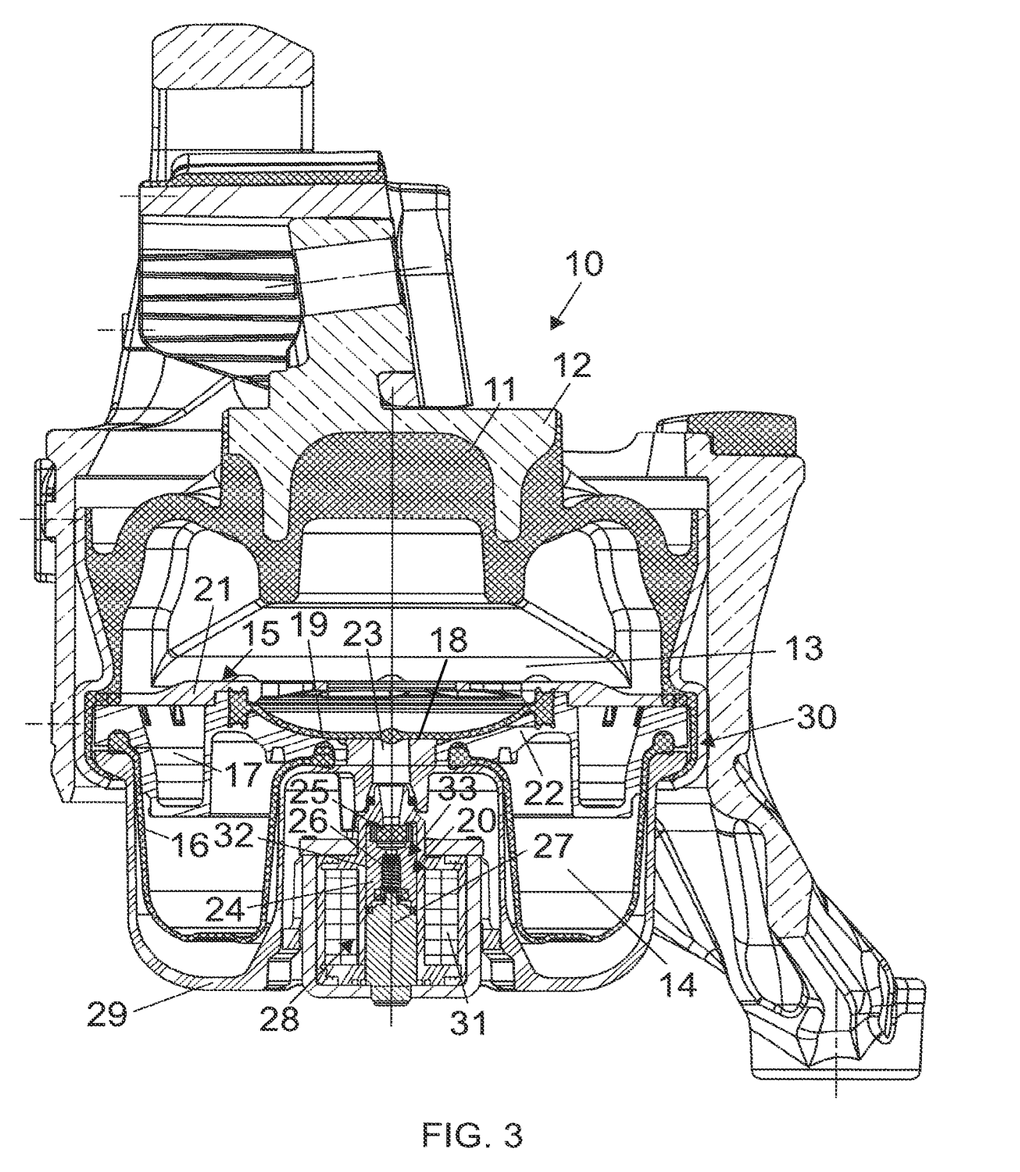
FIG. 3 shows a cross-sectional view of the hydromount from FIGS. 1 and 2, in which the air chamber is completely evacuated.

FIG. 2 shows a state in which the air chamber 18 is already partially evacuated. By repeating the process described above, the air chamber 18 is successively evacuated until there is no air left in the air chamber 18. This state, in which the air chamber 18 is completely evacuated, is shown in FIG. 3. There, the diaphragm 19 is shown in a fully depressed state. The impacts introduced into the mount 10 from outside thus cause an effect of the air chamber 18 being "pumped empty", whereby the stiffness of the diaphragm 19 is increased and the hydromount 10 achieves very high damping values.

In contrast to the driving operation, during which a great stiffness of the diaphragm 19 is desired, it is desirable during the idle operation of the engine that the diaphragm 19 exhibits an elastic behavior. In the case of the oscillations arising at that time, which have a high frequency at a small amplitude, the diaphragm 19 is supposed to oscillate together with the hydraulic liquid. A damping action by means of the hydromount 10 through the damping duct 17 is not desired. For this purpose, the air chamber 18 is filled with air.

To achieve this state, the electromagnet 28 is energized. Thus, the electromagnet 28 generates a force greater than the shutting force of the spring member 26, so that the closure member 25 and the closure device 24 unblock the opening without a pressing force, which is caused by air oscillating in the air chamber 18, acting on the non-return device 20. Air flows into the air chamber 18 from the environment, so that the diaphragm 19 again assumes the position as it is shown in FIG. 1. In this state, the diaphragm 19 is elastic and oscillates against the air in the air chamber.

Due to being adaptable to the respective driving situation, the hydromount 10 has an improved stiffness. In particular, a large spreading of the stiffness that can be obtained with the hydromount 10 is ensured. The present embodiment makes it possible for the energy, which is introduced into the mount 10 anyway, to be used for producing the desired stiffness of the diaphragm 19.

The invention claimed is:

1. A hydromount for mounting a motor vehicle unit, comprising:
    a supporting spring supporting a mount core and surrounding a working chamber; and
    a compensation chamber separated from the working chamber by a dividing wall and delimited by a compensation diaphragm;
    wherein the compensation chamber and the working chamber are filled with a liquid and are connected to each other by a damping duct provided in the dividing wall; the dividing wall has two dividing plates between which a diaphragm is accommodated in a manner capable of oscillating; the diaphragm and the dividing wall delimit an air chamber that can be connected to the environment via an opening in the dividing wall; a switchable non-return device is configured to unblock and close the opening; the non-return device includes a pressure-actuatable non-return valve having an opening pressure corresponding to a predetermined oscillation amplitude of the diaphragm that is at least one of reached and exceeded by the diaphragm during operation of said motor vehicle unit; the opening is incorporated into one of the dividing plates and faces away from the working chamber; the non-return device is accommodated in a cup member connected to a support mount; and a projection of the cup member reaches into the opening.

2. The hydromount according to claim 1, wherein the diaphragm generates a pressing force required for opening the non-return valve upon reaching the oscillation amplitude.

3. The hydromount according to claim 1, wherein the oscillation amplitude is produced via a pressure acting in the working chamber created by exciting the hydromount with a predetermined excitation amplitude via said motor vehicle unit.

4. The hydromount according to claim 1, wherein the non-return device has a spring member and a closure device for closing the opening, wherein the spring member exerts a shutting force on the closure device, wherein the spring member is dimensioned so that the closure device unblocks the opening when the oscillation amplitude is reached.

5. The hydromount according to claim 4, wherein the non-return device includes a stop member for limiting a movement of the closure device in a direction away from the dividing wall.

6. The hydromount according to claim 1, wherein the air chamber is connected with the environment in a first switching state, and the air chamber is shut off from the environment in a second switching state; in the second switching state, the stiffness of the diaphragm is increased compared to the first switching state; and the air chamber is configured to be evacuated during driving operation.

7. The hydromount according to claim 6, wherein the non-return valve is active in the second switching state.

8. The hydromount according to claim 6, wherein the air chamber is configured to be completely evacuated such that the diaphragm is in a fully depressed state.

9. The hydromount according to claim 8, wherein, when in the fully depressed state, the diaphragm rests on the dividing plate including the opening and on the projection of the cup member.

10. The hydromount according to claim 1, wherein the non-return device can be switched by an electromagnet.

11. The hydromount according to claim 1, wherein one of the dividing plates is configured as a nozzle plate.

12. The hydromount according to claim 1, wherein:
    the non-return device includes an adjustable closure device and a spring member exerting a shutting force on the closure device;
    when the non-return device is switched, the closure device is drawn away from the dividing wall and unblocks the opening via the non-return device such that the air chamber is connected with the environment;
    when the non-return device is not switched and the diaphragm is below the oscillation amplitude, the closure device is pushed against the dividing wall and blocks the opening via the spring member such that the air chamber is shut off from the environment; and
    when the non-return device is not switched, air is in the air chamber, and the diaphragm at least one of reaches and exceeds the oscillation amplitude, the closure device is pushed away from the dividing wall and unblocks the opening via a pressing force provided by the diaphragm such that at least some of the air in the air chamber is evacuated into the environment.

13. The hydromount according to claim 12, wherein the diaphragm is configured to successively evacuate air from the air chamber until the air chamber is completely evacuated and the diaphragm is in a fully depressed state when the non-return device is not switched.

14. The hydromount according to claim 1, wherein the dividing plate including the opening has a bell-shaped contour.

15. A hydromount for mounting a motor vehicle unit, comprising:
    a mount core;
    a supporting spring supporting the mount core and surrounding a working chamber;
    a compensation diaphragm surrounding a compensation chamber;
    a dividing wall connected to the supporting spring and the compensation diaphragm, the dividing wall separating the compensation chamber from the working chamber;
    the dividing wall including a first dividing plate, a second dividing plate, and a damping duct connecting the compensation chamber and the working chamber;
    a diaphragm disposed between the first dividing plate and the second dividing plate in a manner capable of oscillating;
    the diaphragm and the dividing wall delimiting an air chamber;

the second dividing plate including an opening connecting the air chamber to an environment; and a switchable non-return device configured to block and unblock the opening, the non-return device including a pressure-actuatable non-return valve having an opening pressure corresponding to a predetermined oscillation amplitude of the diaphragm that is at least one of reached and exceeded by the diaphragm during operation of said motor vehicle unit.

16. The hydromount according to claim 15, wherein:
the non-return device further includes:
   a closure device for closing the opening; and
   a spring member exerting a shutting force on the closure device;
the spring member is dimensioned such that, when the predetermined oscillation amplitude is at least one of reached and exceeded, the shutting force is exceeded by a pressing force provided by the diaphragm.

17. The hydromount according to claim 15, wherein:
the non-return device includes an adjustable closure device and a spring member exerting a shutting force on the closure device;
when the non-return device is in a switched state, the closure device is drawn away from the dividing wall and unblocks the opening via the non-return device such that the air chamber is connected with the environment;
when the non-return device is in an unswitched state and the diaphragm is below the oscillation amplitude, the closure device is pushed against the dividing wall and blocks the opening via the spring member such that the air chamber is shut off from the environment; and
when the non-return device is in the unswitched state, air is in the air chamber, and the diaphragm at least one of reaches and exceeds the oscillation amplitude, the closure device is pushed away from the dividing wall and unblocks the opening via a pressing force provided by the diaphragm such that at least some of the air in the air chamber is evacuated into the environment.

18. The hydromount according to claim 17, wherein the diaphragm is configured to successively evacuate air from the air chamber until the air chamber is completely evacuated and the diaphragm is in a fully depressed state when the non-return device is in the unswitched state.

19. The hydromount according to claim 18, wherein, when in the fully depressed state, the diaphragm rests on the second dividing plate and covers the opening.

20. The hydromount according to claim 17, wherein:
the non-return device further includes an electromagnet;
when the non-return device is in the switched state, the electromagnet is energized and draws the closure device away from the dividing wall; and
when the non-return device is in the unswitched state, the electromagnet is not energized.

* * * * *